(12) United States Patent
Wang et al.

(10) Patent No.: US 7,089,884 B2
(45) Date of Patent: Aug. 15, 2006

(54) PET'S DRESSING CART

(76) Inventors: Jin-Shan Wang, 116, Jin Ling Xin Cun, Dong Shan Hsiang, Yi Lan Hsien (TW); Shang-Lan Huang, 116, Jin Ling Xin Cun, Dong Shan Hsiang, Yi Lan Hsien (TW); Ting-Yi Wang, 116, Jin Ling Xin Cun, Dong Shan Hsiang, Yi Lan Hsien (TW)

( * ) Notice: Subject to any disclaimer, the term of this patent is extended or adjusted under 35 U.S.C. 154(b) by 0 days.

(21) Appl. No.: 10/930,669

(22) Filed: Aug. 31, 2004

(65) Prior Publication Data

US 2006/0042561 A1    Mar. 2, 2006

(51) Int. Cl.
*A01K 15/04* (2006.01)
(52) U.S. Cl. ............... 119/753; 119/755; 119/756; 119/757
(58) Field of Classification Search ........... 119/496, 119/725, 675, 676, 671, 751–757; 5/617, 5/618, 621, 624, 86.1, 628, 488, 622, 623; 280/47.34, 77.2, 416, 47.19, 47.26
See application file for complete search history.

(56) References Cited

U.S. PATENT DOCUMENTS

| 2,092,266 | A | * | 9/1937 | Talas ........................... 5/618 |
| 2,438,979 | A | * | 4/1948 | Short ......................... 119/751 |
| 2,804,845 | A | * | 9/1957 | Plumley et al. ............. 119/756 |
| 3,250,252 | A | * | 5/1966 | Leopold ..................... 119/756 |
| 4,669,136 | A | * | 6/1987 | Waters et al. .................. 5/601 |
| 5,131,106 | A | * | 7/1992 | Jackson ......................... 5/613 |
| 5,444,882 | A | * | 8/1995 | Andrews et al. ............... 5/618 |
| 6,622,324 | B1 | * | 9/2003 | VanSteenburg et al. ........ 5/621 |

* cited by examiner

*Primary Examiner*—Teri Pham Luu
*Assistant Examiner*—Joshua Michener
(74) *Attorney, Agent, or Firm*—Alan D. Kamrath; Nikolai & Mersereau, P.A.

(57) ABSTRACT

A pet's dressing cart for carrying a pet for dressing includes a mobile cart body, two bearing blocks axially movably supported on the base of the mobile cart body for carrying a pet for dressing, a horizontal adjustment mechanism for adjusting the pitch between the bearing blocks, and a holding down mechanism adjusted to hold down the legs of the pet on the bearing blocks.

5 Claims, 8 Drawing Sheets

PET'S DRESSING CART

BACKGROUND OF THE INVENTION

1. Field of the Invention

The present invention relates to an apparatus for a pet and, more specifically, to a pet's dressing cart for carrying a pet for dressing or therapy that can conveniently be moved to the desired working place and adjusted subject to the size of the pet to be dressed or medically examined.

2. Description of the Related Art

Many people may keep dogs, cats, and any of a variety of animals as playthings and treat them with affection. However, raising pets is not simply supplying sufficient animal feeds. A pet raiser needs to frequently clean and dress the pet. When the pet is sick, the pet raiser needs to send the pet to a veterinarian. However, when washing or dressing a pet, the pet may shake or twist the body, thereby causing the raiser to be contaminated or injured by the paws of the pet. When a pet raiser sent a pet to a veterinarian, the pet may be deeply anxious due to an unfamiliar environment. At this time, the veterinarian cannot smoothly examine the pet and tend to be injured by the pet.

Therefore, it is desirable to provide a pet's dressing cart that eliminates the aforesaid problems.

SUMMARY OF THE INVENTION

The present invention has been accomplished under the circumstances in view. It is the main object of the present invention to provide a pet's dressing cart, which is practical for carrying a pet for dressing or medical treatment. It is another object of the present invention to provide a pet's dressing cart, which can conveniently be moved to the desired working place and then positively positioned in the working place. It is still another object of the present invention to provide a pet's dressing cart, which can be conveniently adjusted to fit any of a variety of pets.

To achieve this and other objects of the present invention, the pet's dressing cart comprises a mobile cart body and an adjustment unit. The mobile cart body comprises a base, a handle fastened to the top side of the base, front and rear wheel assemblies provided at the bottom side of the base for enabling the mobile cart body to be conveniently moved to the desired working place, and front and rear stand assemblies provided at the bottom side of the base for supporting the mobile cart body positively on the floor. The adjustment unit comprises two bearing blocks mounted on the base for carrying a pet on the base, a horizontal adjustment mechanism adapted to control movement of the bearing blocks on the base and to further adjust the pitch between the bearing blocks subject to the size of the pet to be dressed or medically examined, and a holding down mechanism adapted to hold down a pet on the bearing blocks.

DETAILED DESCRIPTION OF THE INVENTION

Figure 1:
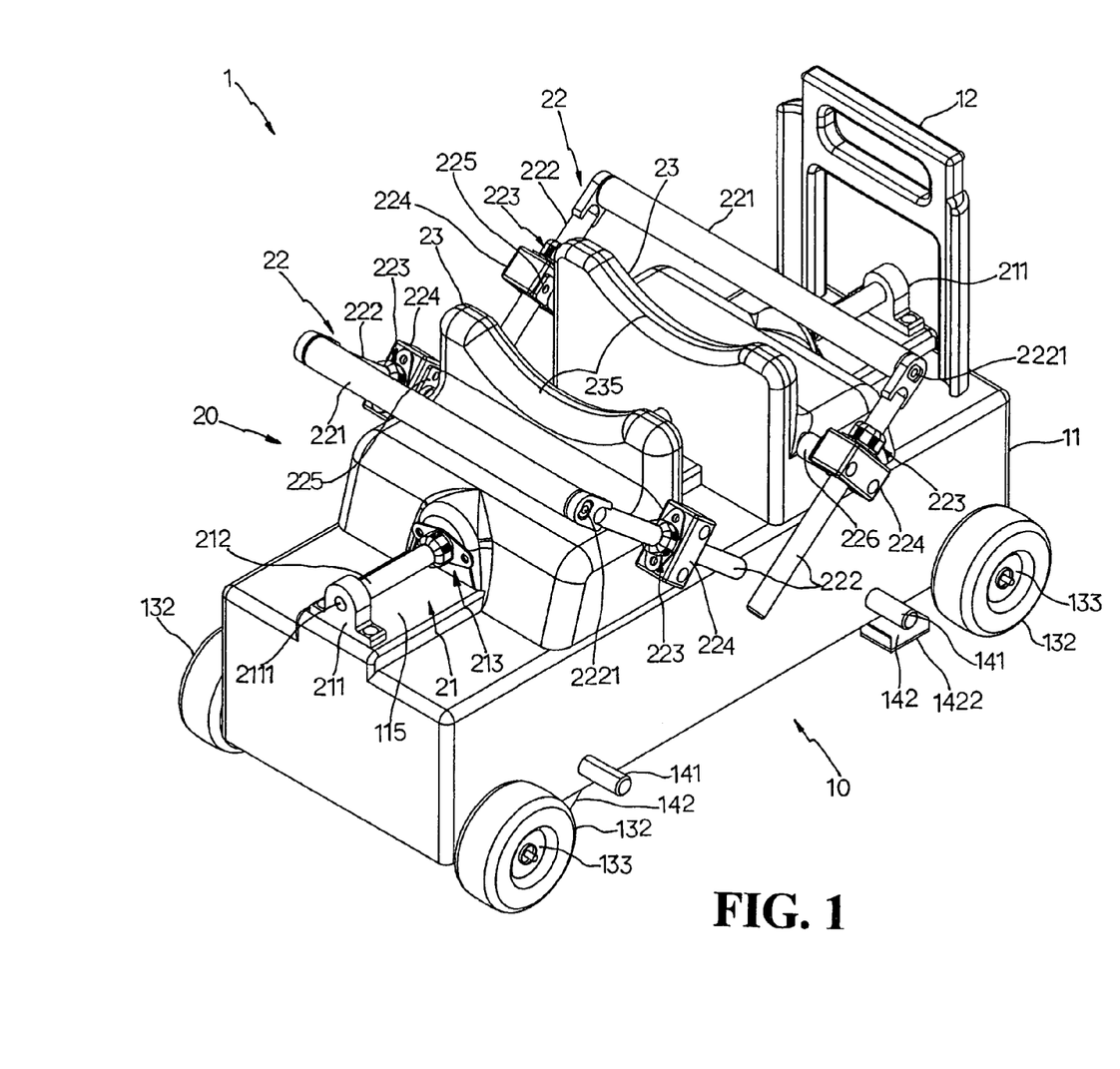
FIG. 1 is an elevational view of a pet's dressing cart according to the present invention.

Referring to FIG. 1, a pet's dressing cart 1 in accordance with the present invention is shown and comprises a mobile cart body 10 and an adjustment unit 20.

Figure 2:
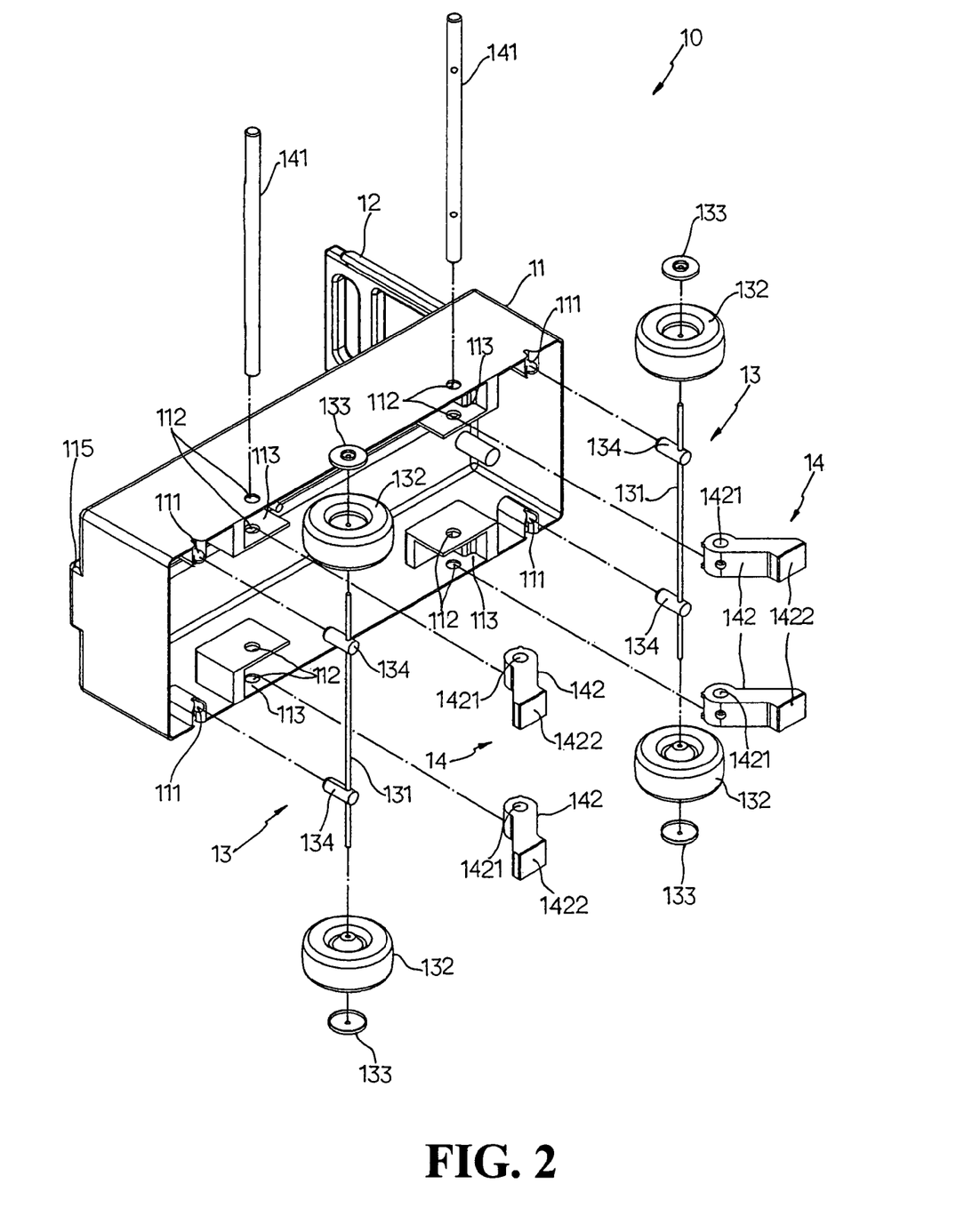
FIG. 2 is an exploded view of the base of the pet's dressing cart according to the present invention.
Figure 3:
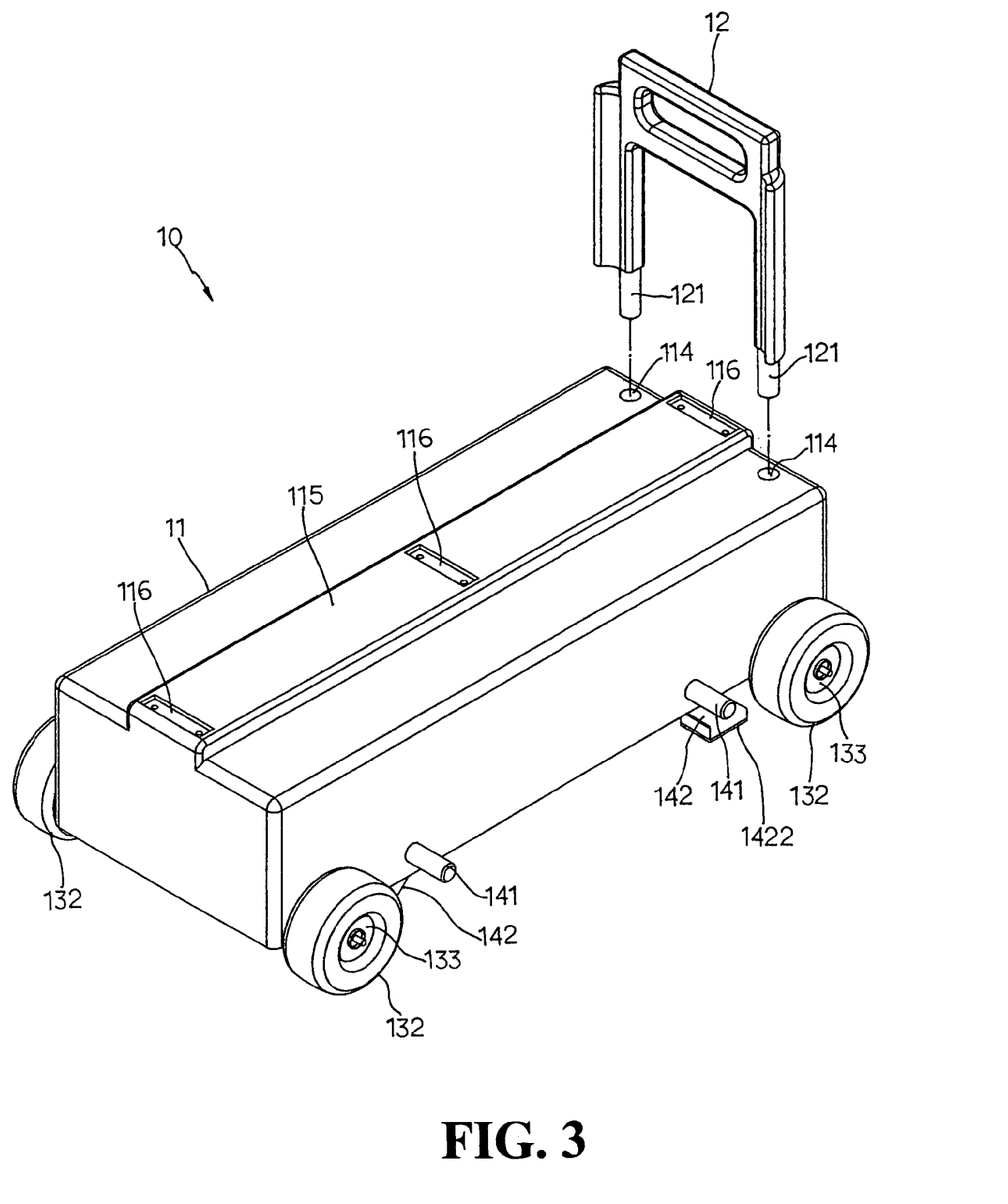
FIG. 3 is an exploded view of a part of the present invention, showing the relationship between the base and the handle.

Referring to FIGS. 2 and 3 and FIG. 1 again, the cart body 10 is comprised of a base 11, a handle 12, front and rear wheel assemblies 13, and front and rear stand assemblies 14. As shown in FIG. 2, the base 11 comprises a plurality of bottom mounting holes 111 symmetrically formed in the bottom side near the four corners. The front and rear wheel assemblies 13 each comprise a wheel axle 131, two wheels 132 pivotally supported on the two distal ends of the wheel axle 131, two caps 133 respectively affixed to the two distal ends of the wheel axle 131 to stop the wheels 132 from falling out of the wheel axle 131, and two pins 134 respectively mounted on the wheel axle 131 near the wheels 132 and respectively fastened to the two bottom mounting holes 111 near the front or rear side of the base 11. The base 11 further comprises a plurality of bottom chambers 113 respectively disposed adjacent to the bottom mounting holes 111, and a plurality of axle holes 112 respectively extended through the bottom chambers 113. The front and rear stand assemblies 14 each comprise an axle 141 fastened to the two axle holes 112 aligned with each other and two stands 142 respectively fastened to the axle 141. The stands 142 each have one end provided with a pivot hole 1421, which is coupled to the respective axle 141, and the other end provided with an anti-skid pad 1422. The handle 12 has two plug pins 121 respectively fastened to respective top pinholes 114 in the top wall near the front side of the base 11.

Figure 4:
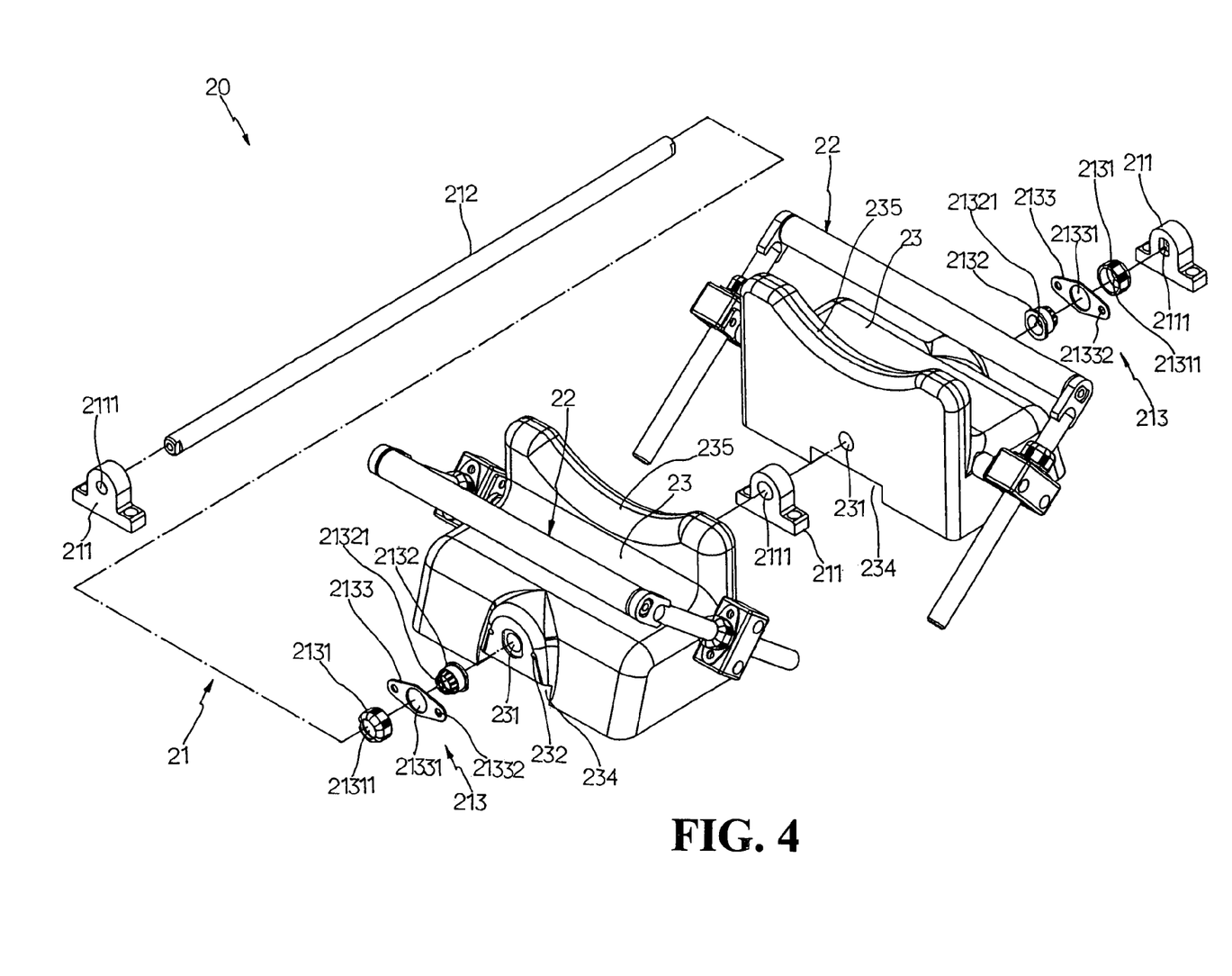
FIG. 4 is an exploded view of the horizontal adjustment mechanism of the adjustment unit of the pet's dressing cart according to the present invention.
Figure 5:
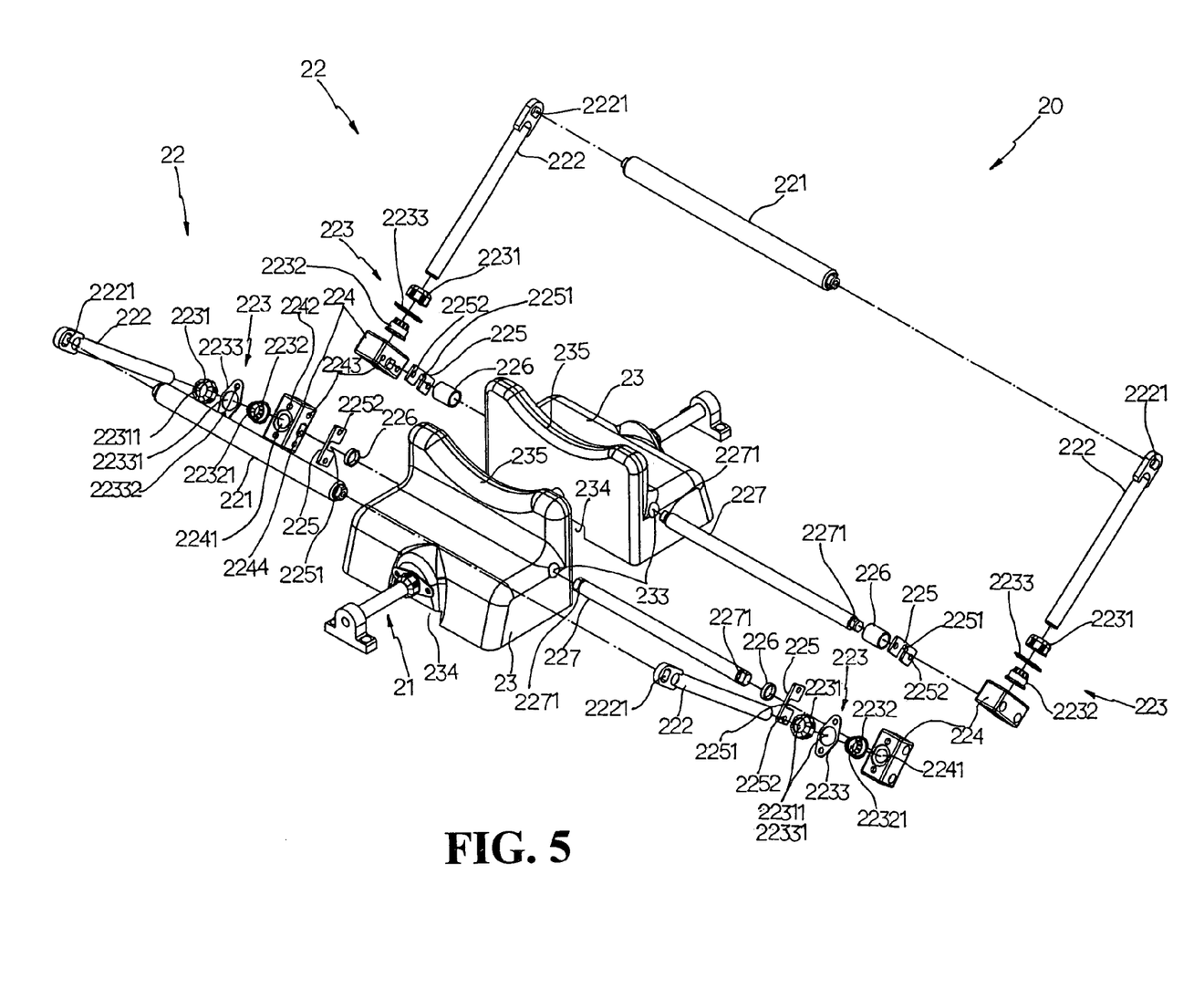
FIG. 5 is an exploded view of the holding down mechanism of the adjustment unit of the pet's dressing cart according to the present invention.

Referring to FIGS. 4 and 5, the adjustment unit 20 is comprised of a horizontal adjustment mechanism 21, a holding down mechanism 22, and front and rear bearing blocks 23. The front and rear bearing blocks 23 are set facing each other, with each comprising a first horizontal axle hole 231 extended in X-axis direction through the middle part thereof near the bottom side and two locating holes 232 arranged in parallel to the first horizontal axle hole 231 at two sides. The horizontal adjustment mechanism 21 comprises three axle holders 211, an axle 212, and two locking devices 213. The axle holders 211 each have a horizontal axle hole 2111. The locking devices 213 are, respectively, on the bearing blocks 23 corresponding to one end of the respective horizontal axle hole 231, with each comprised of a chuck 2131, a tapered split clamping ring 2132, and a locating plate 2133. The chuck 2131, the tapered split clamping ring 2132 and the locating plate 2133 each have a center through hole 21311, 21321, or 21331. The locating plate 2133 has two mounting holes 21332 at two sides of the center through hole 21331. During installation, the tapered split clamping ring 2132 is partially inserted through the center through hole 21331 of the locating plate 2133, and then the tapered split clamping ring 2132 and the locating plate 2133 are attached to one of the bearing blocks 23 corresponding to one end of the horizontal axle hole 231 opposite to the other bearing blocks 23, and then the two mounting holes 21332 are, respectively, fastened to the locating holes 232 of the bearing blocks 23 by fastening means, for example, screws (not shown), and then the chuck 2131 is fastened to the front end of the tapered split clamping ring 2131 and stopped at one side of the locating plate 2133 opposite to the bearing blocks 23. The axle holders 211 are aligned in a line and equally spaced. One of the axle holders 211 is set between the two bearing blocks 23. The other two axle, holders 211 are set at two sides of the two bearing blocks 23. The axle 212 is inserted through the locking devices 213 and the first horizontal axle hole 231 of each of the bearing blocks 23 and supported in the horizontal axle hole 2111 of each of the axle holders 211.

Referring to FIG. 5 again, the bearing blocks 23 are angled blocks each having a second horizontal axle hole 233 extended in Y-axis direction through the connection area between the horizontal and vertical parts thereof. The holding down mechanisms 22 each is comprised of a holding down bar 221, two adjustment rods 222, two locking devices 223, two coupling blocks 224, a plurality of retaining rings 225, two spacer barrels 226, and an axle 227. The locking devices 223 are, respectively, supported on the coupling blocks 224 at two opposite lateral sides of one of the bearing blocks 23 corresponding to the center axle hole 2241 of the respective coupling block 224. Each of the locking devices 223 is comprised of a chuck 2231, a clamping ring 2232, and a locating plate 2233. The chuck 2231, the tapered split clamping ring 2232 and the locating plate 2233 each have a center through hole 22311, 22321, or 22331. The locating plate 2233 has two mounting holes 22332 at two sides of the center through hole 22331. During installation, the tapered split clamping ring 2232 is partially inserted through the center through hole 22331 of the locating plate 2233. Then, the tapered split clamping ring 2232 and the locating plate 2233 are attached to one coupling block 224 corresponding to one end of the center axle hole 2241. Next, the two mounting holes 22332 of the locating plate 2233 are, respectively, fastened to respective locating holes 2242 of the coupling block 224 at two sides of the center axle hole 2241 of the coupling block 224 by fastening means, for example, screws (not shown). Then the chuck 2231 is fastened to the front end of the tapered split clamping ring 2232 and stopped at one side of the locating plate 2233 opposite to the coupling block 224. The adjustment rods 222 each have one end inserted through the center through hole 22311, 22321, 22331 of one of the locking devices 223 and the center axle hole 2241 of each of the coupling blocks 224 and the other end provided with a pivot hole 2221 The holding down bar 221 is pivotally connected between the pivot holes 2221 of the adjustment rods 222. The axle 227 is inserted through the second horizontal axle hole 233 of one of the bearing blocks 23. The two distal ends of the axle 227, respectively, are fastened to a coupling hole 2244 of each of the coupling blocks 224. Two annular locating grooves 2271, respectively, are extended around the periphery near the two distal ends of the axle 227. The two spacer barrels 226 are, respectively, sleeved onto the two distal ends of the axle 227 and stopped at the two opposite lateral sides of the respective bearing blocks 23. The retaining rings 225 are, respectively, fastened to the annular locating grooves 2271 of the axle 227 to secure the spacer barrels 226 to the axle 227. Each retaining ring 225 has a radial split 2251 by which the respective retaining ring 225 can easily be fastened to the annular locating groove 2271 at one end of the axle 227 and has two mounting holes 2252 which can be fastened to respective locating holes 2244 of one coupling block 224 by fastening means, for example, screws (not shown).

In the aforesaid locking devices 213, 223, the chucks 2131, 2231 can be rotated forwards or backwards to compress or release the respective tapered split clamping rings 2132, 2232, so as to further lock the bearing blocks 23 to the axle 212, 227 and the adjustment rods 222 to the coupling blocks 224 or to unlock the bearing blocks 23 from the axle 212, 227 and the adjustment rods 222 from the coupling blocks 224.

Figure 6:
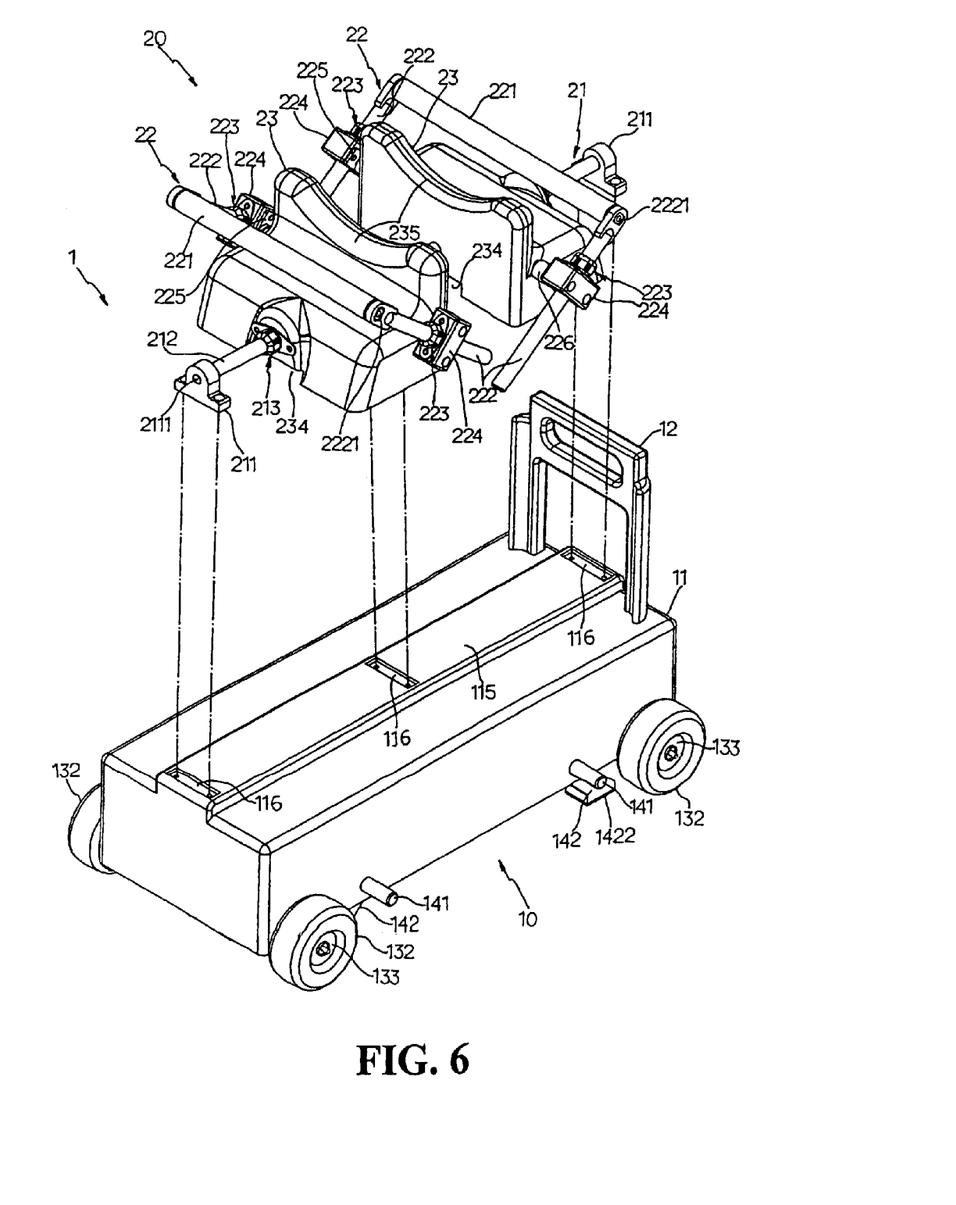
FIG. 6 is an exploded view of the present invention, showing the relationship between the base and the adjustment unit.

Referring to FIG. 6 and FIG. 1 again, the base 11 has a rail 115 protruded from the top wall thereof and extended in X-axis direction, and three mounting grooves 116 respectively formed in the two distal ends and middle part of the rail 115. The three axle holders 211 of the horizontal adjustment mechanism 21 are, respectively, fixedly fastened to the mounting grooves 116, thereby securing the horizontal adjustment mechanism 21 to the base 11. Further, the bearing blocks 23 each have a bottom sliding groove 234, respectively, coupled to the rail 115 of the base 10 to guide movement of the bearing blocks 23 along the rail 115.

Figure 7:
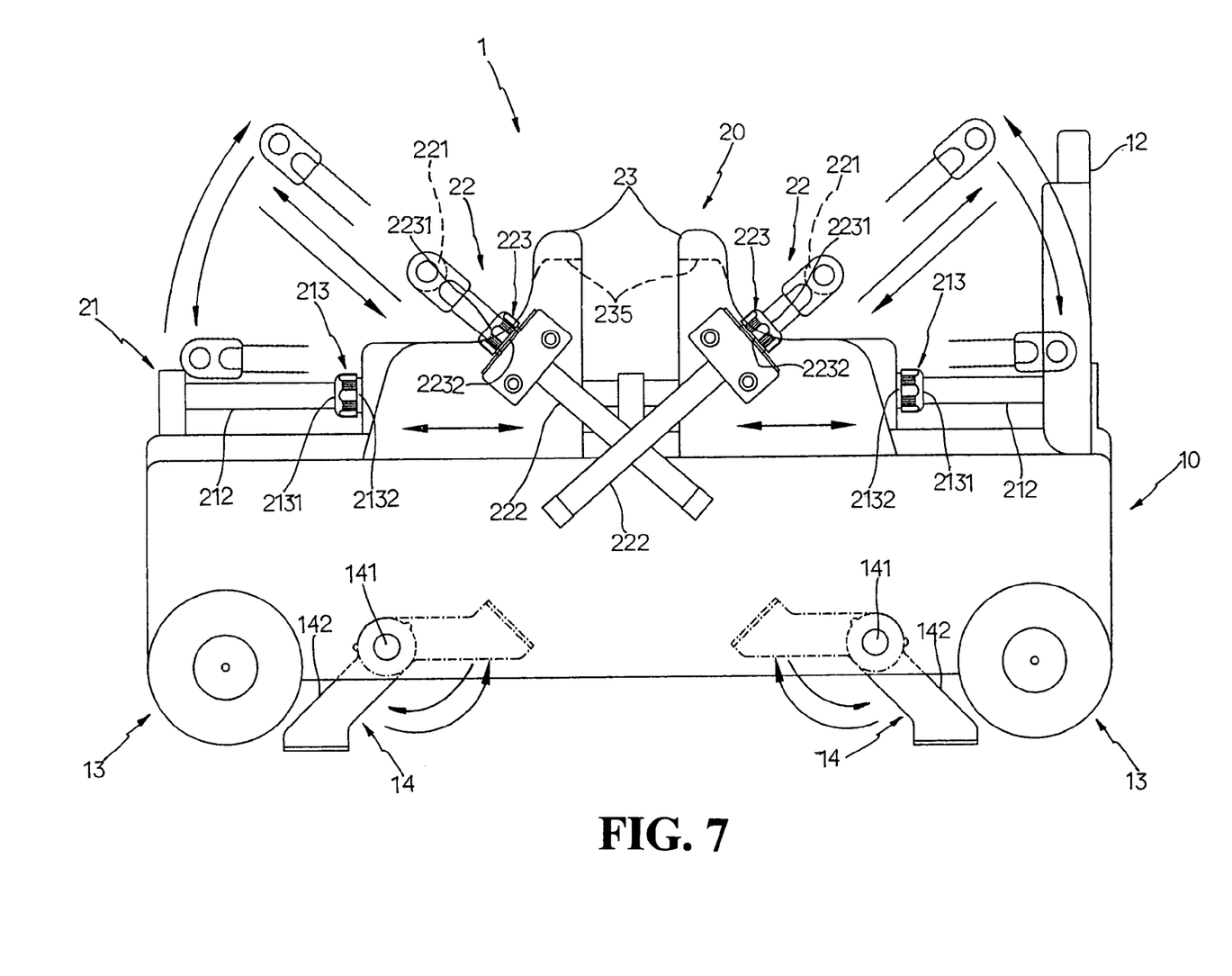
FIG. 7 is a schematic drawing showing the adjustment of the adjustment unit and the front and rear stand assemblies.
Figure 8:
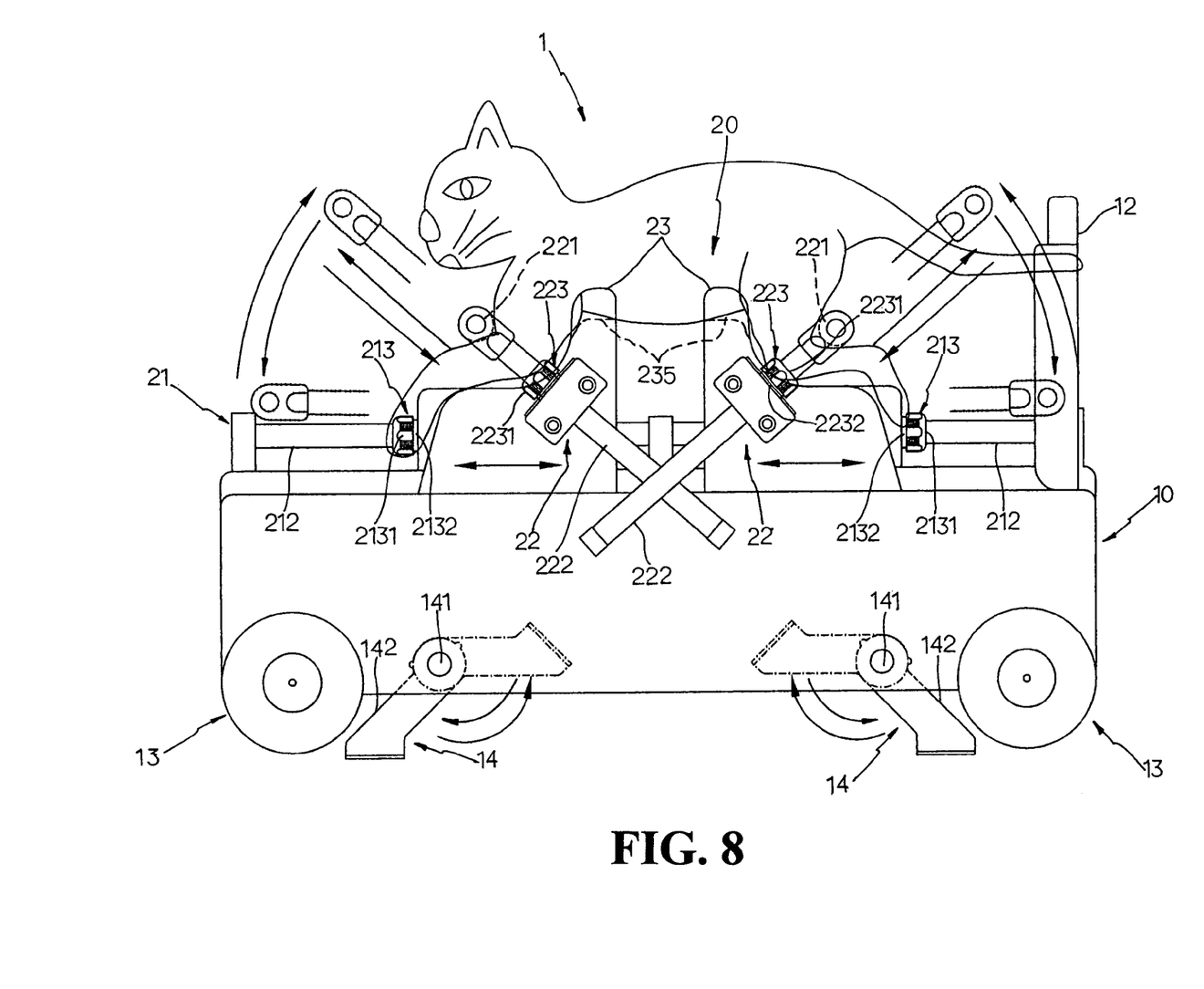
FIG. 8 is a schematic drawing showing an application example of the present invention.

Referring to FIGS. 7 and 8, by the wheels 13 of the base 11 and the handle 12, the user can push the pet's dressing cart 1 to the desired place. After the pet's dressing cart 1 has been moved to the desired place, the stands 142 of the front and rear stand assemblies 14 are, respectively, turned from the non-operative position above the bottom side of the wheels 13 to the operative position below the bottom side of the wheels 13 to support the pet's dressing cart 1 on the floor steadily. The adjustment unit 20 is then adjusted subject to the size of the pet. At this time, the chucks 2131 are loosened to release the tapered split clamping rings 2132 from the axle 212, to move the bearing blocks 23 along the axle 212 relative to each other to adjust the pitch between the bearing blocks 23 where the chucks 2131 are fastened again. After adjustment of the horizontal adjustment mechanism 21, the pet can be stood on the bearing blocks 23 with their belly supported on the inwardly curved top bearing portion 235 of each of the bearing blocks 23. Then, the holding down mechanisms 22 is adjusted to hold down the legs of the pet. By loosening the chucks 2231 to release the respective tapered split clamping rings 2232 from the respective adjustment rods 222, the adjustment rods 222 can be moved forwards/backwards relative to the respective coupling blocks 224 to adjust the elevation of the respective holding down bars 221. After adjustment, the chucks 2231 are fastened up again to lock the adjustment rods 222 to the coupling blocks 224. Preferably, each holding down bar 221 is covered with a sponge or rubber covering so as not to hurt the pet's legs.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A pet's dressing cart comprising:
   a mobile cart body, said mobile cart body comprising a base, said base having a top side and a bottom side, a handle fastened to the top side of said base, front and rear wheel assemblies provided at the bottom side of said base, and front and rear stand assemblies provided at the bottom side of said base; and
   an adjustment unit, said adjustment unit comprising two bearing blocks mounted on said base for carrying a pet on said base, a horizontal adjustment mechanism adapted to control movement of said bearing blocks on said base and to further adjust the pitch between said bearing blocks, and a holding down mechanism adapted to hold down a pet on said bearing blocks;

wherein, said base comprises a plurality of bottom mounting holes symmetrically formed in the bottom side near four corners thereof, a plurality of bottom chambers respectively formed in the bottom side between said bottom mounting holes, and a plurality of axle holes respectively extended through said bottom chambers;

wherein, said front and rear wheel assemblies each comprise a wheel axle having two distal ends, two wheels pivotally and respectively mounted on the two distal ends of said wheel axle, two caps respectively affixed to the two distal ends of said wheel axle to stop said wheels from falling out of said wheel axle, and two pins mounted on said wheel axle and respectively fastened to two of said bottom mounting holes on said base;

wherein, said front and rear stand assemblies each comprise an axle fastened to two of said axle holes on said base and two stands respectively fastened to the axle of the respective stand assembly, said stands each having one end provided with a pivot hole, which is coupled to the respective axle of the respective stand assembly, and an opposite end provided with an anti-skid pad.

2. A pet's dressing cart comprising:

a mobile cart body, said mobile cart body comprising a base, said base having a top side and a bottom side, a handle fastened to the top side of said base, front and rear wheel assemblies provided at the bottom side of said base, and front and rear stand assemblies provided at the bottom side of said base; and an adjustment unit, said adjustment unit comprising two bearing blocks mounted on said base for carrying a pet on said base, a horizontal adjustment mechanism adapted to control movement of said bearing blocks on said base and to further adjust the pitch between said bearing blocks, and a holding down mechanism adapted to hold down a pet on said bearing blocks, wherein said bearing blocks each comprise a longitudinal axle hole extended through front and rear sides thereof on the middle near the bottom; said horizontal adjustment mechanism comprises three axle holders fixedly fastened to said base, an axle inserted through the longitudinal axle hole of said bearing blocks and supported on said axle holders, and two locking devices respectively fastened to said bearing blocks and adapted to lock said bearing blocks to the axle of said horizontal adjustment mechanism, the locking devices of said horizontal adjustment mechanism each comprising a tapered split clamping ring mounted on the axle of said horizontal adjustment mechanism and attached to one said bearing block, a locating plate affixed to one said bearing block to hold said tapered split clamping ring in place, and a chuck adapted to compress said tapered split clamping ring and to further lock said tapered split clamping ring to the axle of said horizontal adjustment mechanism.

3. A pet's dressing cart comprising:

a mobile cart body, said mobile cart body comprising a base, said base having a top side and a bottom side, a handle fastened to the top side of said base, front and rear wheel assemblies provided at the bottom side of said base, and front and rear stand assemblies provided at the bottom side of said base; and an adjustment unit, said adjustment unit comprising two bearing blocks mounted on said base for carrying a pet on said base, a horizontal adjustment mechanism adapted to control movement of said bearing blocks on said base and to further adjust the pitch between said bearing blocks, and a holding down mechanism adapted to hold down a pet on said bearing blocks, wherein said bearing blocks are angled blocks and each comprise a transverse axle hole extended through two opposite lateral sides in connection area between horizontal and vertical parts thereof;

said holding down mechanism comprises two axles respectively inserted through the transverse axle holes of said bearing blocks, four coupling blocks respectively fastened to two distal ends of each of the axles of said holding down mechanism, said coupling blocks each having a center axle hole, a plurality of spacer barrels respectively mounted on said axles of said holding down mechanism and stopped between said coupling blocks and said bearing blocks, a plurality of retaining rings respectively fastened to the axles of said holding down mechanism to secure said spacer barrels in place, two pairs of adjustment rods respectively inserted through the center axle holes of said coupling blocks, two holding down bars respectively pivotally coupled between the two adjustment rods of each of said two pairs of adjustment rods, and two locking devices adapted to lock said adjustment rods to said coupling blocks, the locking devices of said holding down mechanism each comprising a tapered split clamping ring mounted on one said adjustment rod, a locating plate affixed to one of said coupling blocks to hold the respective tapered split clamping ring in place, and a chuck mounted on one said adjustment rod and adapted to compress the respective tapered split clamping ring against the respective adjustment rod and to further lock the respective adjustment rod to the respective coupling block.

4. The pet's dressing cart as claimed in claim 2, wherein said base comprises a rail protruded from the top side and extended on the middle of the top side between two distal ends thereof, and a plurality of mounting grooves respectively formed in said rail; said axle holders of said horizontal adjustment mechanism are respectively fixedly fastened to the mounting grooves in the rail of said base; said bearing blocks each have a bottom sliding groove respectively coupled to the rail of said base to guide movement of said bearing blocks along said rail.

5. The pet's dressing cart as claimed in claim 2 wherein said bearing blocks each have a top bearing portion smoothly curved inwards for supporting the belly of a pet.

* * * * *